Patented Oct. 9, 1945

2,386,350

UNITED STATES PATENT OFFICE 2,386,350

TREATMENT OF HYDROCARBONS

Walter A. Schulze, Bartlesville, Okla., assignor to Phillips Petroleum Company, a corporation of Delaware No Drawing. Application September 3, 1940,
Serial No. 355,257

7 Claims. (Cl. 260—680)

This invention relates to the purification of unsaturated hydrocarbons produced by the thermal and/or catalytic treatment of suitable hydrocarbon materials. More specifically, this invention relates to the purification of the mono-olefin and/or diolefin extracts and the corresponding residua from mixtures produced by the thermal or catalytic treatment of petroleum fractions or hydrocarbon stocks from any source.

In a still more specific sense this invention concerns the purification of said components of hydrocarbon mixtures subsequent to chemical absorption treatment for the segregation of diolefins and prior to further processing in which the impurities so removed would be detrimental.

Various processes for the production of diolefins and particularly of butadiene have been proposed. These include the thermal cracking of petroleum fractions and higher molecular weight hydrocarbons of aliphatic or cyclic nature as well as the catalytic dehydrogenation of paraffins and/or olefins of the same number of carbon atoms. Such processes involve the production and segregation of hydrocarbon mixtures which may contain, in addition to the desired diolefins, paraffins, mono-olefins and other unsaturates of the same or a smaller number of carbon atoms and often of approximately the same boiling range.

The extraction and recovery of diolefins from mixtures of the type described has been attempted by methods such as solvent extraction, chemical separation and the like. Chemical separation processes have proposed the use of solutions of salts of certain heavy metals of groups 1 and 2 of the periodic system and particularly of solutions of cuprous halides. Such cuprous salt solutions function through the formation of addition compounds with unsaturated hydrocarbons according to the following proposed equations:

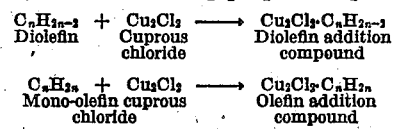

The diolefin addition compounds are formed under conditions such that they are solids, while the olefin compounds remain in solution in the extracting medium. The diolefin may then be recovered by separation of the solid product and by heating same to relatively moderate decomposition temperatures.

The described methods of absorbing unsaturates by the use of cuprous halide solutions have been directed to treating gaseous hydrocarbon mixtures. More recently, it has been found possible to accomplish diolefin absorption and recovery by means of solid-type reagents comprising adsorbent carriers impregnated with suitable metal salts and/or solutions thereof which produce and retain the diolefin addition compound during contact with hydrocarbon fluids. In processes utilizing such solid reagents as described in copending application, Serial No. 354,086, filed August 24, 1940, the hydrocarbon may be in either liquid or vapor phase although liquid phase operation is preferred because of distinct advantages regarding operating flexibility and costs and the size of plant equipment.

In liquid phase absorption of unsaturates with cuprous halide solutions or with solid cuprous halide reagents, it has been found that the above-mentioned olefin and diolefin addition compounds have a definite solubility in the hydrocarbon phase, depending on the temperature of absorption and the composition of the hydrocarbon liquid. Apparently under the conditions favorable to the formation of solid diolefin addition compounds either or both of the addition products are retained in solution to some extent in the liquid residuum and carried away from the cuprous halide reagent. In certain cases $C_4$ hydrocarbon liquids after passage over a cuprous chloride reagent for the removal of butadiene have shown appreciable amounts of copper salt residue on evaporation.

Copper contamination as a result of the chemical separation process is extremely undesirable since it interferes with subsequent treatment of both the diolefin extract and the residuum. This is particularly true of those cyclic processes wherein the residuum from the diolefin extraction step is recycled for further conversion and production of diolefins. For example, the presence of copper in a butene-butane stock being recycled to a thermal or catalytic conversion operation to produce butadiene cannot be tolerated because of the catalytic effect of the copper on decomposition and polymerization reactions with consequent loss of valuable charging stock.

The undesirable consequences of copper contamination are also extended to those processes in which cuprous halide reagents are used to segregate mono-olefins from paraffin-olefin hydrocarbon mixtures. Thus in processes for the separation of butenes from butene-butane mixtures copper compounds may be retained by the butane residuum from the separation process and exert harmful effects in further dehydrogenation or conversion of the paraffinic material.

The extent of contamination of a diolefin extract by copper compounds is less serious due to the sequence of desorbing operations which normally evolve the hydrocarbon in vapor phase from the solid cuprous halide addition product. Proper control of mechanical operations may be adequate in preventing copper carryover in said operations except in cases of mixed phase desorption or of the use of a liquid desorption agent.

The exact nature of the copper compounds retained by hydrocarbon liquids following contact with cuprous salt reagents under the above-mentioned conditions is not known. It is assumed that both the olefin and diolefin addition compounds are present although the former may predominate on the basis of greater overall solubility in various solvents. The types of copper compounds are limited to those formed with unsaturated hydrocarbons since no other salt-forming components are present in the hydrocarbon liquids undergoing treatment.

I have now discovered a method of purification of hydrocarbon liquids of the type described subsequent to treatment with cuprous halide reagents whereby the retained copper compounds are removed and the harmful after-effects of copper contamination are eliminated. My method of purification depends on the conversion of soluble unsaturated hydrocarbon-cuprous halide compounds to insoluble inorganic copper salts which are removed from the purified hydrocarbon liquid.

I have found that when the liquid hydrocarbon residuum from treatment with a cuprous halide reagent is intimately contacted with an aqueous solution of an inorganic compound the anion of which is capable of forming a water-insoluble copper salt that the cuprous halide addition compound is decomposed with the formation of the corresponding inorganic copper salt. The precipitate thus formed remains largely in the aqueous medium, and any dispersed solid may be removed from the hydrocarbon phase by gravity separation, water-washing, filtration or other suitable means. The purified hydrocarbon is then recovered satisfactorily free of copper.

The inorganic compounds which are useful in preparing satisfactory reagent solutions are those which furnish suitable anions in solution and which have no reactivity toward hydrocarbons. To secure satisfactory water solubility I may use the stable, non-volatile compounds of sodium, potassium and ammonium, although compounds of the alkaline earth metals and zinc and magnesium may be used for certain solutions if the water-solubility of the specific compounds is satisfactory.

The anions which are useful in forming water-insoluble copper salts are sulfide, hydroxide, carbonate, phosphate and silicate. These anions may be present alone or in certain combinations such as sulfide and hydroxide which I have found especially effective. All are supplied in water solutions by so-called strong inorganic bases or by the salts of strong bases and weak non-oxidizing acids which produce alkaline solutions by hydrolysis.

The reagent solutions may be prepared by dissolving a quantity of the inorganic compounds in water according to the concentration desired, or in some cases according to the solubility of the compounds in water. Usually solutions containing between 0.5 and 25 weight per cent of dissolved reagents are both effective and economical. Precautions are observed in preparing solutions to prevent the inclusion of ions that are mutually precipitatable in aqueous solution or which react together to form unstable or volatile products apt to contaminate the hydrocarbon liquid.

Intimate contact between the hydrocarbon liquid containing unsaturated hydrocarbon-cuprous halide addition compounds and the aqueous reagent solution may be obtained by any suitable means such as mixing in a centrifugal pump or the like, spraying one liquid in atomized form through the other, or by passing the liquids counter-current to each other in a packed column or the like. Any mixing device which affords sufficient contact to insure rapid reaction between the two immiscible phases is satisfactory.

The temperatures which are suitable for the operation of my process are ordinary atmospheric temperatures of 40° to 110° F. Temperature is not critical as long as the aqueous reagent solution is not frozen or dissolved salts are not precipitated, although higher temperatures are favorable to rapid reaction.

The pressure required by my process are low superatmospheric pressures in the range of 50 to 500 pounds gage. Sufficient pressure is furnished to maintain the hydrocarbon in liquid phase at treating temperatures.

The time of contact may be quite short with extreme intimacy of mixing. Thus, by mixing the hydrocarbon liquid and aqueous solution in 1:1 volume ratio into a temporary emulsion of very fine droplets, the reaction is quickly completed and on separation of the emulsion, the hydrocarbon is satisfactorily purified.

The hydrocarbon liquids which are treated according to the terms of my invention are the products of convertive reactions conducted under severe conditions for producing a high degree of unsaturation. Said liquids are of closely regulated composition and the control of composition, fractionation and conversion are designed to promote high yields and efficient utilization of raw materials. Under these conditions, impurities of the nature of sulfur, nitrogen and oxygen compounds are substantially absent from the raw materials, or are removed during or subsequent to the convertive reactions. In catalytic dehydrogenation and thermal cracking at temperatures above 1000° F. for example, sulfur compounds are converted to hydrogen sulfide and removed from the hydrocarbon vapors prior to the segregation of stocks for the extraction of diolefins. Oxygen compounds, if present, are similarly removed by the reduction in the hydrogen atmosphere of the convertive reactions. Organic nitrogen impurities are totally absent. Thus, the stocks to be purified following the extraction of diolefins contain no compounds capable of combining with copper except the unsaturated hydrocarbons.

The following examples will serve to illustrate specific solution preparations and the use of these solutions for the purification of low-boiling hydrocarbon liquids.

*Example I*

A butene-butane stock was catalytically dehydrogenated and the effluent vapors were deethanized and condensed. The resulting $C_3$—$C_4$ liquid was cooled to a low temperature and passed over a solid reagent consisting of an adsorbent carrier impregnated with cuprous chloride for the absorption of butadiene. The substantially diolefin-free residuum from this treatment which was recycle dehydrogenation feed stock contained an appreciable amount of dissolved copper in the form of the unsaturated hydrocarbon addition compounds. The recycle material was passed to a mixing chamber for contact with a solution of 5 per cent by weight of sodium sulfide and 5 per cent by weight of sodium hydroxide.

The hydrocarbon effluent from the mixing chamber was settled free of aqueous solution and solids, and gave negative results on tests for dissolved copper. The purified material was then returned to the catalytic step for further dehydrogenation.

When the recycle stock was returned to the dehydrogenation without purification, excessive fixed gas losses and coke and heavy polymer formation occurred during the catalytic treatment.

*Example II*

The hydrocarbon liquid of Example I was washed with a solution of sodium phosphate containing 10 per cent by weight of the compound.

The washed and settled hydrocarbon gave no trace of copper salt residue on evaporation, and the purified stock was further dehydrogenated with a good yield of butadiene.

Similar results were obtained using aqueous solutions containing 10 per cent by weight of sodium carbonate and 5 per cent by weight of sodium silicate respectively.

*Example III*

A C₄ hydrocarbon liquid consisting of butadiene, butenes and n-butane was contacted with a solution of cuprous chloride in an immiscible solvent. The solid butadiene-cuprous chloride addition product was removed, and the butene-butane liquid was separated from the cuprous chloride reagent for further dehydrogenation.

This butene-butane liquid contained appreciable amounts of dissolved copper and was washed with a solution of 25 per cent sodium hydroxide. The aqueous solution was separated and the purified C₄ liquid gave no copper residue on evaporation, whereupon it was returned to a dehydrogenation operation for the production of further butadiene.

When a water-soluble sulfide was added to the caustic solution, copper sulfide was precipitated in the aqueous solution following contact with the C₄ liquid.

*Example IV*

N-butane was dehydrogenated to produce butenes and the effluents were condensed and freed of light gases. The liquid butene-butane mixture was then contacted with a solution containing cuprous chloride to segregate the butenes, while the unconverted butane was available for recycling to the dehydrogenation step.

The liquid effluent from the cuprous chloride treatment was contaminated with sufficient dissolved copper-olefin addition product to give a copper salt residue on evaporation. This liquid was washed with an aqueous sodium carbonate-sodium sulfide solution containing 5 per cent by weight of each salt, and after washing and settling was free of copper. This purified material was then recycled for further dehydrogenation with satisfactory results.

While the foregoing disclosure and examples have illustrated the invention and described several specific applications for obtaining the desired results, other modifications will be obvious to those skilled in the art according to the principles outlined. Therefore, the scope of the invention is limited only by the appended claims.

I claim:

1. In a process for the production of butadiene which comprises dehydrogenating butane to produce butenes and butadiene, extracting the butadiene from the dehydrogenated liquid by means of a cuprous halide reagent and recycling the residuum from the cuprous halide treatment for further dehydrogenation, the step of purifying said residuum prior to recycling by treatment with an aqueous solution of an alkaline-reacting non-oxidizing inorganic compound the anion of which forms a water-insoluble copper salt.

2. The process of claim 1 in which the inorganic compound comprises a water-soluble inorganic sulfide.

3. The process of claim 1 in which the inorganic compound comprises a water-soluble phosphate.

4. The process of claim 1 in which the inorganic compound comprises a water-soluble silicate.

5. A process for the manufacture of diolefins which comprises converting a hydrocarbon feed at least partially to diolefins in a conversion step, passing a low-boiling hydrocarbon liquid derived from the effluent and comprising the diolefins so produced in contact with a reagent in the form of a solid adsorbent carrier impregnated with a cuprous halide under such conditions that substantially all of said diolefins are retained by said reagent in the form of an addition compound with said cuprous halide, removing the substantially diolefin-free liquid residuum, purifying said liquid residuum by treating same with an aqueous solution of an alkaline-reacting water-soluble inorganic compound the anion of which forms a water-insoluble copper salt, and recycling the so purified residuum to said conversion step for further conversion to said diolefins.

6. A process for the recovery of diolefins from a liquid hydrocarbon stream comprising diolefins and other hydrocarbons which comprises contacting said stream in liquid phase and substantially free from sulfur compounds with a cuprous halide reagent under conditions such that substantially all of said diolefin combines with said cuprous halide to form an essentially insoluble addition compound, separating the substantially diolefin-free liquid residuum from the reagent, said residuum containing an appreciable amount of dissolved copper in the form of unsaturated hydrocarbon-cuprous halide addition compounds, and intimately contacting said residuum directly with an aqueous solution of an alkaline-reacting water-soluble inorganic compound the anion of which forms a water insoluble copper compound to thereby remove copper from said residuum.

7. The process of claim 1 in which said aqueous solution comprises an alkali metal sulfide and an alkali metal hydroxide.

WALTER A. SCHULZE.